Figure 1:
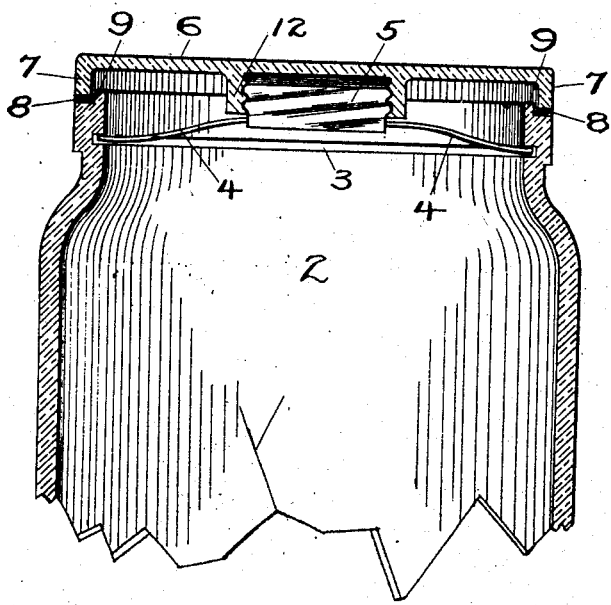

D. BLOOM.
RECEPTACLE CLOSURE.
APPLICATION FILED DEC. 27, 1910.

1,027,685.

Patented May 28, 1912.

WITNESSES:
H.G. Pint.
P.S. Pidwell

INVENTOR
DAVID BLOOM.
by Miller & White
his ATTORNEYS.

UNITED STATES PATENT OFFICE.

DAVID BLOOM, OF BERKELEY, CALIFORNIA.

RECEPTACLE-CLOSURE.

1,027,685.   Specification of Letters Patent.   Patented May 28, 1912.

Application filed December 27, 1910. Serial No. 599,355.

*To all whom it may concern:*

Be it known that I, DAVID BLOOM, a citizen of the United States, and a resident of the city of Berkeley, county of Alameda, and State of California, have invented certain new and useful Improvements in Receptacle-Closures, of which the following is a specification.

The invention relates to improvements in receptacle closures for bottles, jars, cans, buckets or other vessels in which fruit, vegetables or other food products are to be contained or preserved.

The object of the invention is to provide a closure which is yieldingly held to its seat on the receptacle by means of a resilient member within the receptacle.

Another object of the invention is to provide a closure which may be held to its seat by different degrees of tension, depending on the degree of flexure of the resilient member.

A further object of the invention is to provide a closure, which in combination with a partial vacuum within the receptacle will hermetically seal the receptacle and prevent the air from coming in contact with the food products therein.

A further object of the invention is to provide a closure which may be secured to the receptacle before the products therein are processed and which has the quality of yielding slightly to allow the expanded air in the receptacle to escape, as the air and contents expand under the action of heat, and which will firmly seat itself on the receptacle when the processing is discontinued.

In the method of preserving food products by hermetically sealing them in receptacles, the products are placed in the receptacles and heated or processed to drive off the air, and the closures are applied. As the contents and the receptacle cool, the air and contents in the receptacle contract, thereby seating the closure more tightly and forming a partial vacuum in the receptacle.

By the use of the closure of my invention, the receptacles are covered and closed before the contents are processed, so that the contents will not come in contact with the steam in the heating chamber, nor will the drippings from the condensation of the steam fall into the receptacles and contaminate the contents. The closure of my invention is held to its seat by means of a resilient tension member within the receptacle, so that the receptacle is sealed against ingress of air as soon as the closure is applied. During the processing operation, however, the pressure of the interior of the receptacle is increased and this pressure raises the closure slightly to allow the excess air to escape.

With these and other objects in view, as will more fully hereinafter appear, the invention consists of certain novel features of construction and arrangement of parts hereinafter fully described, illustrated in the accompanying drawings and particularly pointed out in the appended claims, it being understood that various changes in the form, proportion, size, material and minor details of the structure may be made without departing from the spirit or sacrificing any of the advantages of the invention.

The following description explains at length the nature of my said improvements and the manner in which I proceed to apply the same in the production of a receptacle closure, reference being had to the accompanying drawings.

Figure 2:
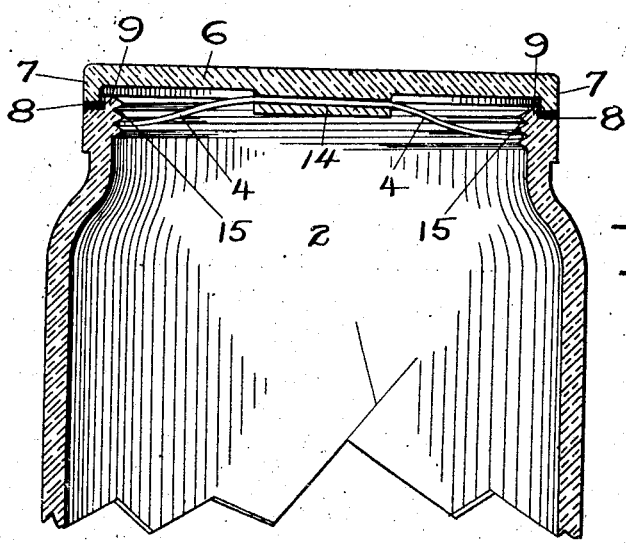

Figure 1 is a vertical section through the closure and part of the receptacle, showing the closure secured to the receptacle. Fig. 2 is a similar view of a modification of the closure.

In the drawings I have shown the closure as arranged in connection with a glass jar, but it is understood that it may be applied to other receptacles with equal efficiency. The jar 2 is provided with a groove 3 on the inside of the neck near the mouth. This groove 3 may extend all around the neck or may be formed in two parts diametrically opposite each other.

Arranged within the neck of the receptacle, and removable therefrom, is a resilient tension member 4 having its ends in engagement with the groove or grooves 3. The resilient tension member is a flat spring which is formed of some resilient material such as wood, bamboo or metal, but when metal is used it is preferable that the metal be of a quality which is not effected or corroded by the contents of the receptacle. Mounted at the center of this spring 4 is a grooved or threaded cap or ferrule 5, which may be formed of the aforementioned materials or of glass when desired.

The cover or closure 6 is preferably made of the same material as the receptacle or it may be formed of other material as desired. Centrally located on the under side of the cover is an internally threaded socket 12 which is adapted to engage the cap 5 when the cover is in place, and cause the cap to be drawn up as the cover is revolved, thereby flexing the spring 4. The cap 5 may be formed on the cover and the socket 12 arranged on the spring when desired, without varying the operation of the closure.

When the closure is used in connection with glass jars or similar receptacles in which food products are to be preserved the cover may be formed with a depending rim 7 which is adapted to bear against the rubber ring or packing 8 to form a tight joint. The packing 8 may be held in place by the small lip 9 extending around the neck of the receptacle.

Before the cover is placed on the receptacle the spring 4 is horizontal, but when it is drawn upward at the center by means of the rotation of the cover, it is put into tension and exerts a downward pull on the cover. The degree of tension may be varied by varying the amount of rotation of the cover. During the processing operation, the internal pressure increases, and when this pressure becomes greater than the tension in the spring the cover is raised and the excess air allowed to escape.

In the modification shown in Fig. 2, I have attached the spring 4 directly to the cover 6 by passing it through a slot in the boss 14. Instead of screwing the cover onto a cap and thereby putting tension in the spring, I provide an internal screw thread 15 in the neck of the receptacle, and by revolving the cover on the receptacle, the ends of the spring 4, which engage the threads, are screwed downward and the necessary tension is put into the spring.

When it is desired to remove the cover, it is turned in the opposite direction and the tension of the spring is released. In some instances it may be necessary to raise one side of the cover slightly to allow the vacuum in the receptacle to be destroyed before the cover can be turned to release the tension.

I claim:

1. A closure for receptacles comprising a cover, a substantially horizontal resilient member located within the receptacle and arranged to hold the cover to its seat, and means for varying the tension in said member.

2. A closure for receptacles comprising a cover, a flat spring member within the receptacle engaging the cover and the receptacle and means in operative connection with said member for varying the tension thereof.

3. A closure for receptacles comprising a cover, a flat spring member engaging the bottom of the cover and the interior of the receptacle adjacent the mouth and means in operative connection with said member for varying the tension in said spring member.

4. The closure for receptacles comprising a cover, a resilient member engaging the inner face of the receptacle and the cover and means, comprising a screw thread, for varying the tension in said resilient member, adapted to be operated by the rotation of the cover.

5. A closure for receptacles comprising a receptacle having a groove therein on the inner face, a flat spring engaging in said groove, a screw threaded member secured to the spring, and a cover provided on its bottom face with an internally screw-threaded socket, adapted to engage said screw-threaded member, and vary the tension in the spring as the cover is rotated.

6. A closure for receptacles comprising a receptacle having a groove in the inner face adjacent to the mouth, a flat spring engaging in said groove, a screw threaded member secured to the spring, and a cover provided on its bottom face with an internally screw threaded socket to receive said member, said cover being provided with a depending rim adapted to bear against a rubber ring on the receptacle.

7. A closure for receptacles comprising a cover, a resilient member located within the receptacle and having its ends in connection with the interior of the receptacle and its intermediate portion in adjustable connection with the cover, whereby rotation of the cover causes said member to bend to vary its resilient force in holding the cover to its seat.

8. A closure for receptacles comprising a receptacle having a groove therein on the inner face, a flat spring engaging in said groove, a screw threaded member attached to said spring, and a cover provided on its bottom face with a complementary screw thread adapted to engage said screw threaded member.

9. A closure for receptacles comprising a receptacle having a groove therein on the inner face, a spring engaging in said groove, a cover, and means attached to said spring adapted to engage the cover to vary the flexure of said spring as the cover is rotated.

DAVID BLOOM.

Witnesses:
H. G. Prost,
P. S. Pidwell.